United States Patent
Karame et al.

(10) Patent No.: US 10,819,506 B2
(45) Date of Patent: Oct. 27, 2020

(54) METHOD FOR STORING A DATA FILE

(71) Applicant: NEC Laboratories Europe GmbH, Heidelberg (DE)

(72) Inventors: Ghassan Karame, Heidelberg (DE); Claudio Soriente, Madrid (ES); Hubert Ritzdorf, Zurich (CH); Srdjan Capkun, Zurich (CH)

(73) Assignee: NEC CORPORATION, Tokyo (JP)

( * ) Notice: Subject to any disclaimer, the term of this patent is extended or adjusted under 35 U.S.C. 154(b) by 239 days.

(21) Appl. No.: 15/766,007

(22) PCT Filed: Oct. 7, 2015

(86) PCT No.: PCT/EP2015/073151
§ 371 (c)(1),
(2) Date: Apr. 5, 2018

(87) PCT Pub. No.: WO2017/059899
PCT Pub. Date: Apr. 13, 2017

(65) Prior Publication Data
US 2018/0287782 A1    Oct. 4, 2018

(51) Int. Cl.
*H04L 9/08* (2006.01)
*G06F 16/13* (2019.01)
(Continued)

(52) U.S. Cl.
CPC .......... *H04L 9/0816* (2013.01); *G06F 3/0608* (2013.01); *G06F 3/0641* (2013.01);
(Continued)

(58) Field of Classification Search
CPC ... H04L 9/0816; H04L 9/0631; G06F 3/0641; G06F 3/0608; G06F 16/13; G06F 9/45558
(Continued)

(56) References Cited

U.S. PATENT DOCUMENTS

| 8,959,332 B2 * | 2/2015 | Augenstein | G06F 11/1453 |
| | | | 713/150 |
| 9,003,200 B1 * | 4/2015 | Gardner | G06F 16/137 |
| | | | 713/189 |

(Continued)

FOREIGN PATENT DOCUMENTS

| EP | 2012235 A2 | 1/2009 |
| WO | WO 2011076463 A1 | 6/2011 |

OTHER PUBLICATIONS

M Uma et al: "An Efficient Data Chunking Non-Sequential Storage to Defend Against Cyber Attacks", Proc. Of Int. Conf. on Advances in Communication, Network, and Computing, CNC, Feb. 22, 2014 (Feb. 22, 2014), pp. 723-729, XP055268871.

*Primary Examiner* — David J Pearson
*Assistant Examiner* — Badri Champakesan
(74) *Attorney, Agent, or Firm* — Leydig, Voit & Mayer, Ltd.

(57) ABSTRACT

A method for storing a data file, 'DF' on a storage entity, 'SE' includes a computing entity, 'CE', chunking the DF into a number of blocks using a one-way-function and a chunking key. The CE may compute a hash value for each of the blocks. One or more proxies, 'PE', may check whether the blocks are already stored, resulting in a first number of already stored blocks and a second number of blocks not being stored. The CE may encrypt the blocks not being stored using an encryption key, transmit the encrypted blocks to the SE for storing, and inform the PE about the hash value of each of the transmitted blocks and corresponding storage location information of the transmitted blocks.

15 Claims, 7 Drawing Sheets

(51) Int. Cl.
*G06F 3/06* (2006.01)
*G06F 9/455* (2018.01)
*H04L 9/06* (2006.01)

(52) U.S. Cl.
CPC .......... *G06F 9/45558* (2013.01); *G06F 16/13* (2019.01); *H04L 9/0631* (2013.01)

(58) Field of Classification Search
USPC .......................................................... 713/193
See application file for complete search history.

(56) References Cited

U.S. PATENT DOCUMENTS

| | | | |
|---|---|---|---|
| 9,053,124 B1* | 6/2015 | Dornquast | G06F 16/2329 |
| 9,246,890 B2* | 1/2016 | Sao | H04L 63/0428 |
| 2006/0015945 A1* | 1/2006 | Fields | H04L 67/2823 |
| | | | 726/27 |
| 2007/0223691 A1* | 9/2007 | Takashima | G11B 20/00507 |
| | | | 380/200 |
| 2009/0171888 A1* | 7/2009 | Anglin | G06F 16/113 |
| 2012/0201378 A1* | 8/2012 | Nabeel | H04L 9/008 |
| | | | 380/255 |
| 2012/0290842 A1* | 11/2012 | Artishdad | H04L 67/06 |
| | | | 713/168 |
| 2013/0054544 A1* | 2/2013 | Li | G06F 3/0641 |
| | | | 707/693 |
| 2014/0093077 A1* | 4/2014 | Jawurek | H04L 63/123 |
| | | | 380/268 |
| 2015/0006895 A1* | 1/2015 | Irvine | H04L 9/3242 |
| | | | 713/171 |

\* cited by examiner

METHOD FOR STORING A DATA FILE

CROSS-REFERENCE TO PRIOR APPLICATIONS

This application is a U.S. National Stage Application under 35 U.S.C. § 371 of International Application No. PCT/EP2015/073151 filed on Oct. 7, 2015. The International Application was published in English on Apr. 13, 2017 as WO 2017/059899 under PCT Article 21(2).

FIELD

The present invention relates to a method for storing a data file on a storage entity.

The present invention further relates to a method for reading a data file.

Even further the present invention relates to a method for deleting a data file.

Even further the present invention relates to a system for storing a data file on a storage entity.

Even further the present invention relates to a non-transitory computer readable medium storing a program causing one or more computing devices to execute a process for storing a data file.

BACKGROUND

The ever-growing amount of storage and the centralization of storage have led to increased usage of deduplication techniques. Deduplication aims at storing redundant data only once and thereby reduces storage requirements for storage providers.

There are mainly two deduplication techniques: file-based and block-based deduplication (as for example disclosed in the non-patent literature of João Paulo and José Pereira, "A survey and classification of storage deduplication systems," ACM Comput. Surv., 47(1):11:1-11:30, June 2014). Block-based deduplication allows storage size reduction even if files only partly match. However, it comes with the additional task of chunking a file. The chunking can produce fixed-sized or variable-sized blocks, where variable-sized blocks are computed based on the file content.

According to conventional methods, block-based deduplication with variable-sized blocks can provide the biggest storage savings, ahead of block-based deduplication with fixed-sized blocks and file-based deduplication (as disclosed in the non-patent literature of Dutch T. Meyer and William J. Bolosky, "A study of practical deduplication," pages 1-13, 2011). Deduplication provides storage size reduction and thereby cost savings, but additional properties may be desirable. Such properties are data confidentiality, secure deletion (as disclosed in the non-patent literature of Joel Reardon, David Basin, and Srdjan Capkun, "On Secure Data Deletion," IEEE Security & Privacy Magazine, pages 37-44, 2014), or assisted deletion (as disclosed in the non-patent literature of Hubert Ritzdorf, Nikolaos Karapanos, and Srdjan Capkun, "Assisted Deletion of Related Content," Proceedings of the 30th Annual Computer Security Applications Conference, ACSAC '14, pages 206-215, New York, N.Y., USA, 2014 ACM). These properties can be combined with file-based deduplication using approaches such as DupLESS (as disclosed in the non-patent literature of Mihir Bellare, Sriram Keelveedhi, and Thomas Ristenpart, "Dupless: Server-aided encryption for deduplicated storage," Proceedings of the 22nd. USENIX Conference on Security, SEC'13, pages 179-194, Berkeley, Calif., USA, 2013 USENIX Association).

However, the present inventors have recognized that as variable-sized blocks are computed based on the file contents, their structure leaks additional information to the storage provider that can compromise properties such as confidentiality or secure deletion.

As data deduplication has gained importance, conventional methods addressing security and privacy implications are e. g. Rabin Fingerprints (as disclosed in the non-patent literature of Michael O. Rabin, "Fingerprinting by random polynomials," Harvard Aiken Computation Laboratory, pages 1-12, 1981). These are commonly used to split a file into chunks. Rabin Fingerprints are based on polynomial division and allow the computation of very efficient rolling checksums. This means a sliding window can be moved over the file and checksums can be computed at every offset by just updating the previous checksum instead of a complete recalculation.

Convergent encryption (as disclosed in the non-patent literature of John R. Douceur, Atul Adya, William J. Bolosky, Dan Simon, and Marvin Theimer, "Reclaiming space from duplicate files in a serverless distributed file system," Proceedings of the 22nd. International Conference on Distributed Computing Systems (ICDCS 2002), pages 617-624, Washington, D.C., USA, 2002, IEEE Computer Society) allows different users to generate the same ciphertext from the same plaintext by deriving the encryption key from a cryptographic hash function computed over the plaintext. Thereby, cross-user deduplication becomes possible. However, the present inventors have recognized as stated convergent encryption leaks the equality information about the plaintexts based on the ciphertexts, which leads to guessing attacks. Therefore, convergent encryption only has security guarantees for unpredictable data and is not semantically secure (as e.g. disclosed in the non-patent literature of Mihir Bellare and Sriram Keelveedhi, "Interactive message-locked encryption and secure deduplication," In Jonathan Katz, editor, Public-Key Cryptography PKC 2015, volume 9020 of Lecture Notes in Computer Science, pages 516-538. Springer Berlin Heidelberg, 2015).

Consequently, other conventional methods with stronger security guarantees were developed. DupLESS (as disclosed in the non-patent literature of Mihir Bellare, Sriram Keelveedhi, and Thomas Ristenpart, "Dupless: Server-aided encryption for deduplicated storage," In Proceedings of the 22nd. USENIX Conference on Security, SEC'13, pages 179-194, Berkeley, Calif., USA, 2013, USENIX Association) provides deduplication and strong encryption by introducing a keyserver and generating the encryption key based on the file content and the keyserver's secret. However, DupLESS only supports file-based deduplication. Other conventional methods treat files differently based on their popularity (as disclosed in the non-patent literature of Jan Stanek, Alessandro Sorniotti, Elli Androulaki, and Lukas Kencl, "A secure data deduplication scheme for cloud storage," In Nicolas Christin and Reihaneh Safavi-Naini, editors, Financial Cryptography and Data Security, volume 8437 of Lecture Notes in Computer Science, pages 99-118, Springer Berlin Heidelberg, 2014) with weaker security for popular and stronger security for unpopular files. Data frequency has also been used to improve the deduplication savings (as disclosed in the non-patent literature of Guanlin Lu, Yu Jin, and David H. C. Du, "Frequency based chunking for data de-duplication, In Proceedings of the 2010 IEEE International Symposium on Modeling, Analysis and Simulation of Computer and Telecommunication Systems, MASCOTS '10, pages 287-296, Washington, D.C., USA, 2010. IEEE Computer Society). In an alternative method (as disclosed in the non-patent literature of Pasquale Puzio, Refik Molva, Melek Onen, and Sergio Loureiro, "Block-level de-duplication with encrypted data. Open Journal of Cloud Computing" (OJCC), 2014, ISSN: 2199-1987, 06 2014) an additional gateway applies a second layer of encryption and thereby protects against the short-comings of convergent encryption. This gateway might however turn out to be a bottleneck. In case of a more complicated privilege setting, different privileges can be enforced using a hybrid method with private and public clouds (as disclosed in the non-patent literature of Jin Li, Yan Kit Li, Xiaofeng Chen, P. P. C. Lee, and Wenjing Lou, "A hybrid cloud method for secure authorized deduplication," Parallel and Distributed Systems, IEEE Transactions on, 26(5):1206-1216, May 2015) while shared ownership can even be implemented in agnostic clouds (as disclosed in the non-patent literature of Claudio Soriente, Ghassan O. Karame, Hubert Ritzdorf, Srdjan Marinovic, and Srdjan Capkun, "Commune: Shared ownership in an agnostic cloud," in Proceedings of the 20th ACM Symposium on Access Control Models and Technologies, SACMAT '15, pages 39-50, New York, N.Y., USA, 2015 ACM).

SUMMARY

Embodiments of the present invention provide a method for storing a data file, 'DF' on a storage entity, 'SE'. The method includes, a computing entity, 'CE', chunking the DF into a number of blocks using a one-way-function and a chunking key. The CE may compute a hash value for each of the blocks. One or more proxies, 'PE', may check whether the blocks are already stored, resulting in a first number of already stored blocks and a second number of blocks not being stored. The CE may encrypt the blocks not being stored using an encryption key, transmit the encrypted blocks to the SE for storing, and inform the PE about the hash value of each of the transmitted blocks and corresponding storage location information of the transmitted blocks.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
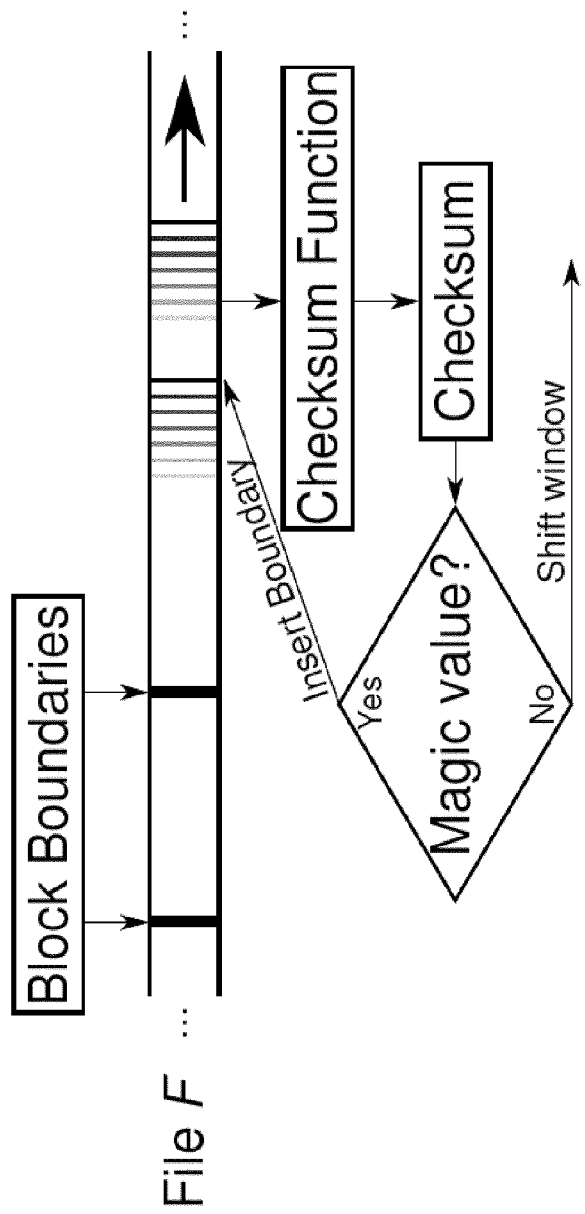
FIG. 1 shows a conventional variable-sized block-based deduplication method.

Although applicable in general, the present invention will be described with regard to deduplication.

Although applicable in general to any kind of deduplication, the present invention will be described with regard to block-based deduplication.

One of the problems addressed by embodiments of the present invention is that variable-size block-based deduplication techniques leaking significantly more information about file contents than file-based deduplication techniques. A further problem addressed by embodiments of the present invention is to enhance storage efficiency and data confidentiality.

In an embodiment, the present invention provides a method for storing a data file, 'DF' on a storage entity, 'SE', including the steps of:
  a) Chunking the DF into a number of blocks using a one-way-function and a chunking key by a computing entity, 'CE',
  b) Computing a hash value for each of the blocks by the CE,
  c) Checking, by one or more proxies, 'PE', if the blocks are already stored resulting in a first number of already stored blocks and a second number of blocks not being stored,
  d) Encrypting, by the CE, the blocks not being stored using an encryption key,
  e) Transmitting, by the CE, the encrypted blocks to the SE for storing and
  f) Informing, by the CE, the PE about the hash values of the transmitted and corresponding storage location information of the transmitted blocks.

In a further embodiment the present invention provides a method for reading a data file stored with a method according to embodiments of the present invention, that includes the steps of,
  A) Querying by the CE one or more of the PE for information about the DF,
  B) Providing the information about the DF by the queried proxies,
  C) Downloading the blocks of the DF by the CE,
  D) Decrypting the downloaded blocks, and
  E) Merging the decrypted blocks to the DF.

In a further embodiment the present invention provides a method for deleting a data file stored with a method according to embodiments of the present invention, including the steps of:
  A1) Requesting, by the CE, the deletion of the DF from the PE,
  B1) Decrementing a usage counter for all blocks used by the DF,
  C1) Deleting by the PE for all blocks used by the DF, when the usage counter reaches zero, the corresponding encryption keys and/or chunking keys,
  D1) Informing the SE to delete the DF
  E1) Deleting the corresponding encryption keys and/or chunking keys on the CE.

In a further embodiment the present invention provides a system for storing a data file, 'DF', including:
  At least one computing entity, 'CE',
  a proxy, 'PE', and
  a storage entity, 'SE' for storing the DF,
  the CE being adapted to a) Chunk the DF into a number of blocks using a one-way-function and a chunking key,
b) Compute a hash value for each of the blocks,
d) Encrypt the blocks not being stored using an encryption key,
e) Transmit the encrypted blocks to the SE for storing and
f) Inform, the PE about the hash values of the transmitted and corresponding storage location information of the transmitted blocks, and
the PE being adapted to
d) Check if the blocks are already stored resulting in a first number of already stored blocks and a second number of blocks not being stored.

In a further embodiment the present invention provides a non-transitory computer readable medium storing a program causing one or more computing devices to execute a process for storing a data file, 'DF' on a storage entity, 'SE', including the steps of:
a) Chunking the DF into a number of blocks using a one-way-function and a chunking key,
b) Computing a hash value for each of the blocks,
c) Checking if the blocks are already stored resulting in a first number of already stored blocks and a second number of blocks not being stored,
d) Encrypting the blocks not being stored using an encryption key,
e) Transmitting the encrypted blocks to the SE for storing, and
f) Informing about the hash values of the transmitted and corresponding storage location information of the transmitted blocks.

At least one of the embodiments has the advantage that security deduplication is enabled without leaking any information about the contents. A further advantage of at least one embodiment of the present invention is a protection against a strong attack which is common to all block-based deduplication techniques where an adversary can guess the files by simply of serving the size of stored blocks.

The term "data file" refers to any kind of information or information parts, which may or may not be associated with each other in a data structure like a computer file or the like.

The terms "storage entity", "proxy entity", "proxy", "computing entity", "client", "client computing entity" refer each to a device adapted to perform computing like a personal computer, a tablet, a mobile phone, a server, or the like and includes one or more processors having one or more cores and may be connectable to a memory for storing an application which is adapted to perform corresponding steps of one or more of the embodiments of the present invention. Any application may be software based and/or hardware based installed in the memory on which the processor(s) can work on. The devices may be adapted in such a way that the corresponding steps to be computed are performed in an optimized way. For instance different steps may be performed in parallel with a single processor on different of its cores. Further one or more of the devices may be identical or combined forming a single computing device.

The term "chunking key" refers to any kind of information or information parts, which may enable, include, etc. information to be used for dividing or chunking information like da to file, or the like into different parts.

The term "encryption key" refers to any kind of information or information parts, which may enable, include, etc. information to be used for encryption of information.

The term "hypervisor" refers to a virtual machine monitor or the like and may be instantiated as a piece of computer software, firmware or hardware that creates and runs virtual machines. These virtual machines run on one or more computing devices and may be adapted in such a way to perform certain steps or execute certain computer-implemented code.

The term "computer readable medium" may refer to any kind of medium, which can be used together with a computation device or computer and on which information can be stored. The information may be any kind of data which can be read into a memory of a computer. For example the information may include program code for executing with the computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

Prior to step a) a hash value over the DF may be computed by the CE and the hash value may be transmitted by the CE to the PE to check if the DF has already been stored. This allows in an efficient way to check if the complete DF has already been stored.

If the DF has already been stored, the steps a)-f) may not performed. This allows to avoid unnecessary execution of steps a)-f) if the complete data file has already been stored. Thus, computational resources are saved.

The encryption key may be computed based on at least one of: contents of the DF, a secret. This enables in an efficient way to generate an encryption key including information of the DF to be stored.

The secret may be based on proxy information and/or CE information. This enhances the security in particular when for example the secret is based on proxy information and CE information.

The secret may be computed by the PE and provided to the CE and/or is computed by the CE. This enables for example to enhance flexibility, since the secret may be computed by an entity, e.g. other than a CE.

The one way function may be based on AES. AES is the Advanced Encryption Standard also known as Rijndael, and is a specification for the encryption of electronic data established by the U.S. National Institute of Standards and Technology (NIST) in 2001 as announced in Federal Information Processing Standards Publication 197, United States National Institute of Standards and Technology (NIST), Nov. 26, 2001, Retrieved Oct. 2, 2012. AES can be then used as a checksum function in order to achieve non-reversibility of the checksumming process and sufficient entropy for the checksumming parameters. Thus, AES enables to chunk a file based on the secret key without revealing the secret key or the plaintext.

The chunking key is protected by at least one of: trusted computing, hardware dongle, secure multi-party computation. Since every client assuming that there is a plurality of clients connected to the storage entity needs to use the chunking key and since this chunking key protects data confidentiality it is a potential weak point for an adversary. Using at least one of trusted computing, hardware dongle and secure multi-party computation enhances the security. Most commercially available systems support trusted computing and therefore an easy implementation can be provided.

Hardware dongles, on the other hand, can in particular be used within a corporate scenario. Hardware dongles can be distributed among users. The chunking key could then be stored on these temper-proved dongles to prevent key leakage. The plaintext would be sent to the dongle which would execute the checking procedure and return the chunking boundaries. Since an adversary would only be able to pick inputs to the chunking procedure and observe their for example AES-based outputs, the adversary would not learn the chunking key.

When employing secure multi-party computation (as for example disclosed in the non-patent literature of Wilko Henecka and Thomas Schneider, "Faster secure two-party computation with less memory," in Proceedings of the 8th ACM SIGSAC Symposium on Information, Computer and Communications Security, ASIA CCS '13, pages 437-446, New York, N.Y., USA, 2013 ACM) this enables to limit the key exposure. The chunking key may then be stored and provided by a different entity. In the multi-party protocol the parties would not learn the other parties input. In this way a client cannot learn the chunking key while the key-storing party cannot learn the plaintext. For example if the proxy entity serves as second party, only a single entity would have to know the chunking key. If a trusted computing component or hardware dongle would serve as a second party, the key would be protected due to their tamper-proof nature.

The trusted computing may be provided by a hypervisor entity as CE. Since already deployed TPMs usually do not offer AES support a hypervisor can be used to protect the chunking key. The hypervisor can either use static or dynamic route-of-trust techniques so that the trusted code would be able to access the chunking key. Additionally the hypervisor entity may be used in connection with further features or properties such as secure deletion or the like.

The hypervisor entity may communicate with the PE by one or more secure channels. This enables a confidential integrity-protected exchange of information between the one or more PE and the hypervisor entity.

The one-way function may be an oblivious one-way function. An oblivious one-way function further enhances the security in protecting the chunking key while being efficient.

The CE may be a client computing entity. This enhances flexibility since the corresponding steps can be performed on a client itself.

The PE may regularly check at least part of the stored information on the SE and verify its correctness. This enables to detect cheating clients and storage errors so that their impact is limited.

The P are provided in form of client computing entities. This avoids a central bottleneck and a single point of failure since then the data transmitted to or from the proxies is distributed among the CE directly, for example through a distributed hash table. Additionally, a check for availability and reachability of the clients can be implemented. Thus security is enhanced.

There are several ways how to design and further develop the teaching of the present invention in an advantageous way. To this end it is to be referred to the patent claims subordinate to the independent patent claims on the one hand and to the following explanation of further embodiments of the invention by way of example, illustrated by the figure on the other hand. In connection with the explanation of the further embodiments of the invention by the aid of the figures, generally further embodiments and further developments of the teaching will be explained.

FIG. 1 shows a conventional variable-sized block-based deduplication method.

In FIG. 1 a scheme of variable-sized block-based deduplication is shown. Across a file F, a so-called sliding window is moved and a checksum is computed at every byte-offset. If the checksum matches a specified so-called magic value, a chunk boundary is inserted. Otherwise the window keeps moving. The checksum function is used to achieve the non-reversibility of the checksumming process and sufficient entropy for checksumming parameters.

Figure 2:
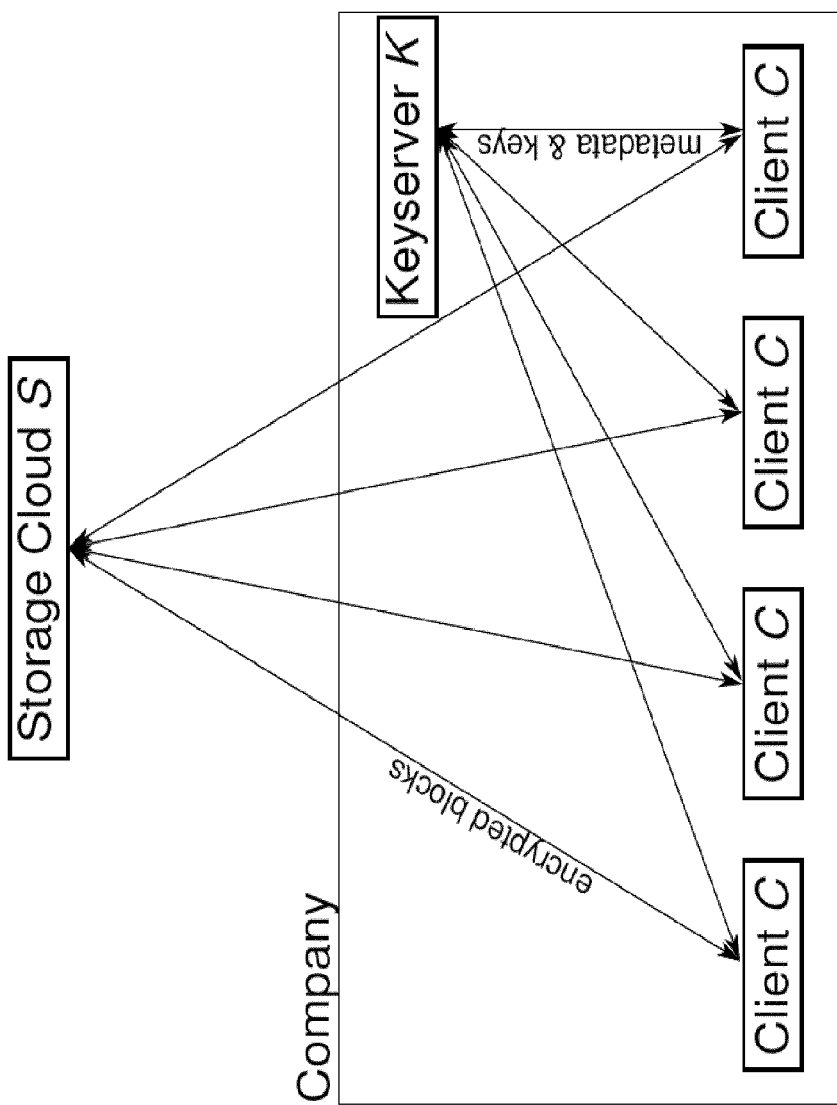
FIG. 2 shows part of a system according to an embodiment of the present invention.

FIG. 2 shows a system according to an embodiment of the present invention.

In FIG. 2 an overall setup is shown with a plurality of clients C communicating with a keyserver K exchanging meta-data and keys with the corresponding clients C. The clients C exchange encrypted blocks with a storage cloud/provider S, wherein the storage provider S is a third-party storage provider. The clients C and the keyserver K are—in FIG. 2—part of a company network. The clients C are known and therefore trusted as they can be identified and punished in case of misbehavior. The keyserver K is run by the company and the clients C know the chunking key for chunking.

Figure 3:
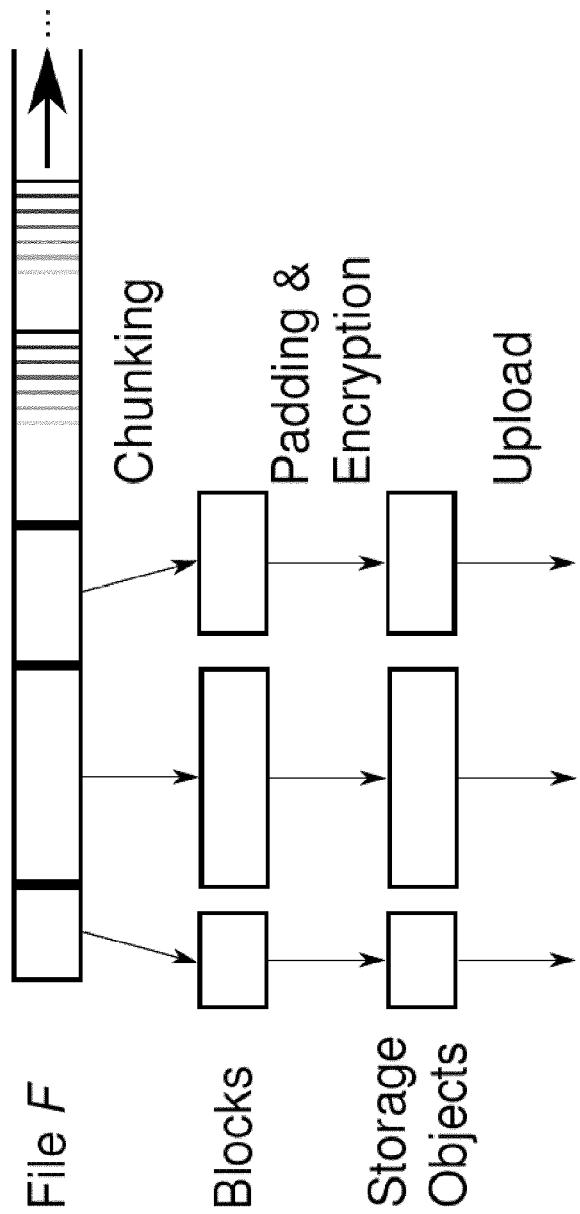
FIG. 3 shows part of the steps of a method according to an embodiment of the present invention.

FIG. 3 shows part of the steps of a method according to an embodiment of the present invention.

In FIG. 3 steps for writing a file F assuming the scenario shown in FIG. 2 are shown. Communication with the keyserver K is not shown.

In a first step C computes a cryptographic hash over F and sends it to K to check if F is already known. If F is known, the operation is complete.

In a second step if F is not known C chunks the file using the AES approach and kc.

In a third step C computes cryptographic hashes for the blocks and sends them to K to check if they are already known.

In a fourth step C generates the encryption key $k_e$. The generation can involve a second party and its secrets as well as C's secrets and the contents of F.

In a fifth step C encrypts every unknown block using a key $k_e$ and uploads it to S.

In a sixth step C informs K about the hashes, the used random keys $k_e$ and the storage locations for the previously unknown blocks.

Figure 4:
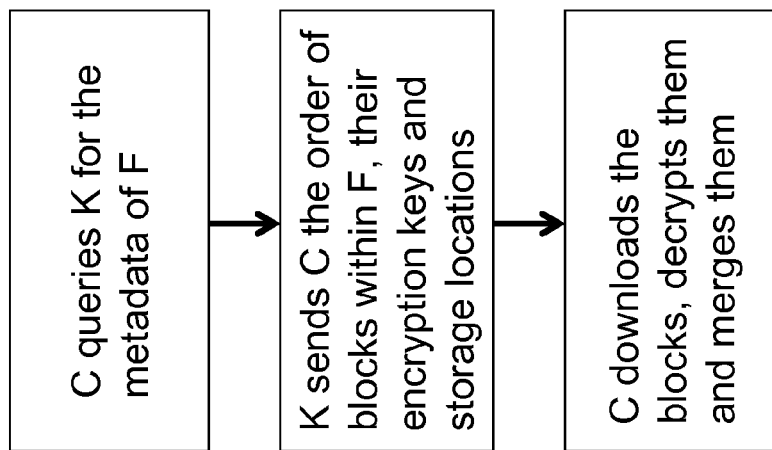
FIG. 4 shows part of the steps of a method according to an embodiment of the present invention.

FIG. 4 shows part of the steps of a method according to a further embodiment of the present invention.

In FIG. 4 steps for reading a file F are shown.

In a first step C queries K for the metadata of F.

In a second step K sends C the order of blocks within F, their encryption keys and storage locations.

In a third step C downloads the blocks, decrypts them and merges them.

Figure 5:
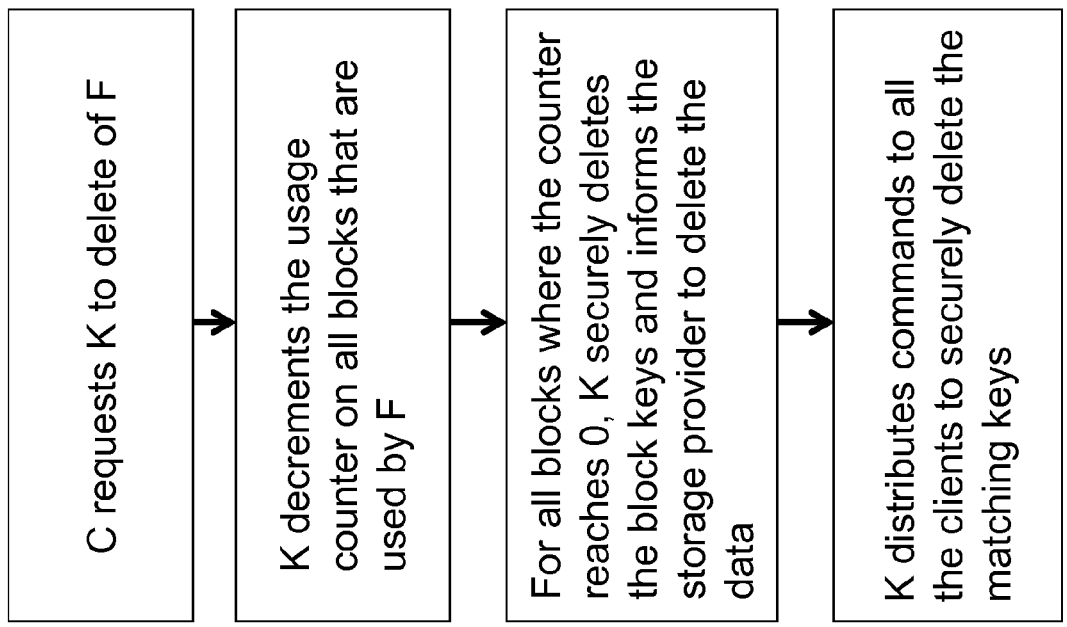
FIG. 5 shows part of the steps of a method according to an embodiment of the present invention.

FIG. 5 shows part of the steps of a method according to a further embodiment of the present invention.

In FIG. 5 steps for deleting a file F are shown.

In a first step C requests K to delete of F.

In a second step K decrements the usage counter on all blocks that are used by F.

In a third step for all blocks where the counter reaches 0, K securely deletes the block keys and informs the storage provider S to delete the data.

In a fourth step K distributes commands to all the clients C to securely delete the matching keys.

Figure 6:
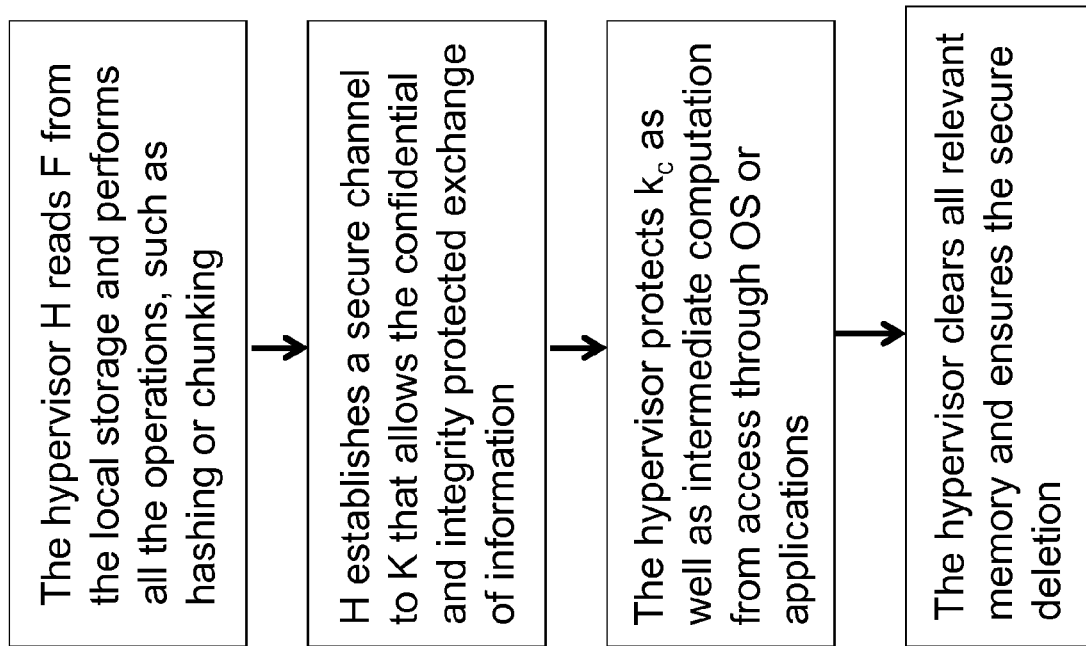
FIG. 6 shows part of the steps for a chunking key protection according to an embodiment of the present invention.

FIG. 6 shows part of the steps for a chunking key protection according to a further embodiment of the present invention.

In FIG. 6 steps for a chunking key protection by trusted computing using a hypervisor H are shown.

In a first step the hypervisor H reads F from the local storage and performs all the operations, such as hashing or chunking.

In a second step H establishes a secure channel to K that allows the confidential and integrity-protected exchange of information.

In a third step the hypervisor protects $k_c$ as well as intermediate computation from access through an operating system or applications.

In a fourth step at the end, the hypervisor clears all relevant memory and ensures the secure deletion.

Figure 7:
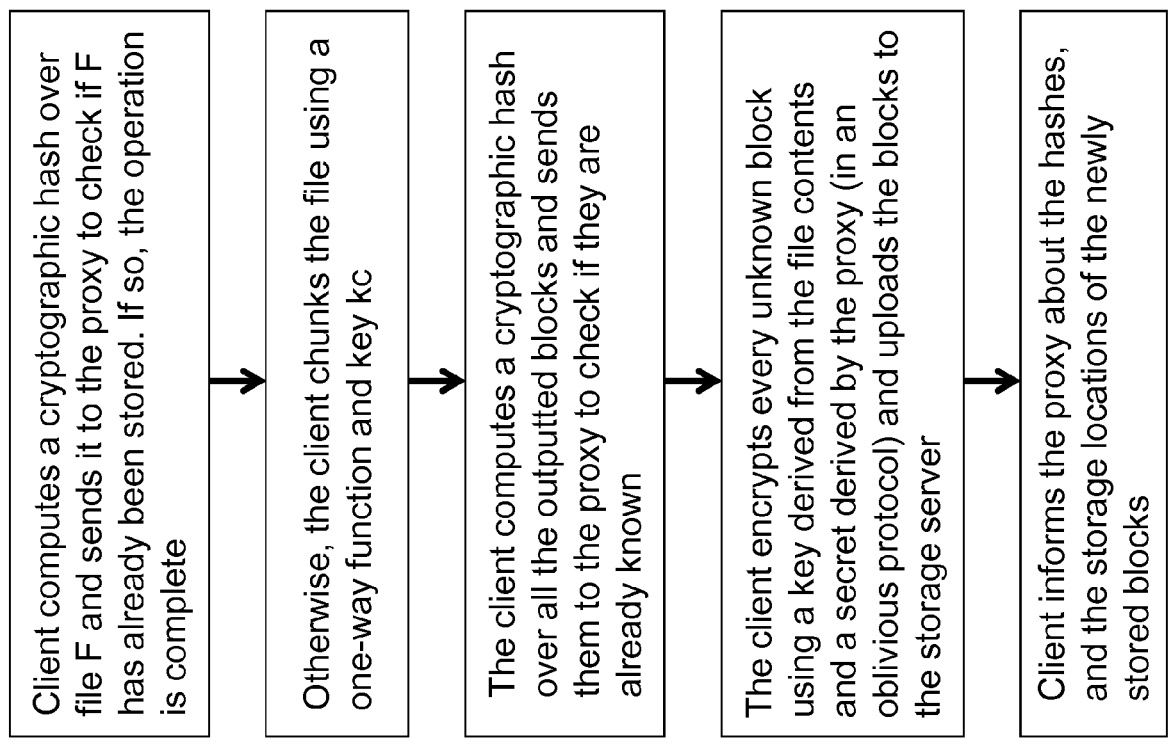
FIG. 7 shows part of the steps of a method according to an embodiment of the present invention.

FIG. 7 shows part of the steps of a method according to a further embodiment of the present invention.

In a first step a client C computes a cryptographic hash over file F and sends it to the proxy to check if F has already been stored. If so, the operation is complete.

In a second step the client C chunks the file using a one-way function and key L.

In a third step the client C computes a cryptographic hash over all the outputted blocks and sends them to the proxy K to check if they are already known.

In a fourth step the client encrypts every unknown block using a key derived from the file contents and a secret derived by the proxy K (e.g. in an oblivious protocol) and uploads the blocks to the storage server S.

In a fifth step the client C informs the proxy K about the hashes, and the storage locations of the newly stored blocks.

The above steps provides secure deletion, data confidentiality and storage savings based on variable-sized block-based deduplication. It serves as a scheme and can be instantiated in different ways: The keyserver K can keep achieving secure deletion of encryption keys by storing them locally on a securely deleting medium. Either in this case the medium has to scale linearly with the overall storage size at the storage provider.

Further to achieve secure deletion based on a fixed size medium the keyserver K can employ conventional techniques as disclosed for example in the non-patent literature of Joel Reardon, Hubert Ritzdorf, David Basin, and Srdjan Capkun, "Secure data deletion from persistent media, in Proceedings of the 2013 ACM SIGSAC Conference on Computer 38; Communications Security, CCS '13, pages 271-284, New York, N.Y., USA, 2013. ACM.

In embodiment's of the present invention the keyserver K also distributes metadata. In order to avoid a central bottleneck in a single point-of-failure the metadata could also be distributed among the clients C directly, for example through a distributed hash table. Additional requirements about availability and reachability for the clients C may apply.

To detect misbehaving clients or storage failures, a machine, for example the keyserver K may regularly check some of the stored data and verify its correctness. This enables to detect cheating clients and storage errors and limits their impact.

To summarize the present invention does not reveal the data located at the boundaries or an identifiable size pattern, only—by their construction—block sizes and thus the rough overall file size. Therefore leakage is reduced through this component compared with conventional systems and methods. Further secure deletion is enabled as clients C and the key server K securely deletes keys and metadata for discarded data blocks. Finally as the keyserver K is able to observe access patterns and shared content between different files, the keyserver can also offer assisted deletion to notify user about files that should be deleted. Consequently this frees storage space further reducing storage costs and prevents inadvertent information leakage.

The present invention enables a secure deduplication of blocks in a cloud without leaking any information about the content. Further, the present invention enables protection against a strong attack which is common to all block-based deduplication techniques where the adversary can guess the files by simply observing the size of the stored blocks. Thus, the present invention protects the confidentiality of deduplicated data even against side channel attacks where the adversary can guess content based on deduplicated block sizes.

Further, the present invention enables
1) Chunking a file into variable size blocks using a trapdoor one-way function based on a secret which is not known to the adversary.
2) Performing the aforementioned operation in an oblivious manner by executing an oblivious protocol with the proxy who holds the secret key.
3) Performing the aforementioned operation without leaking the secret by leveraging support from secure hardware (e.g., trusted computing or secure dongle).
4) Achieving secure deletion over block-based deduplication.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for storing and deleting a data file, 'DF' on a storage entity, 'SE', comprising the steps of:
   a) Chunking the DF into a number of blocks using a one-way-function and a chunking key by a computing entity, 'CE',
   b) Computing a hash value for each of the blocks by the CE, c) Checking, by one or more proxies, 'PE', whether the blocks are already stored resulting in a first number of already stored blocks and a second number of blocks not being stored,
d) Encrypting, by the CE, the blocks not being stored using an encryption key,
e) Transmitting, by the CE, the encrypted blocks to the SE for storing,
f) Informing, by the CE, the PE about the hash value of each of the transmitted blocks and corresponding storage location information of the transmitted blocks, and
g) Deleting the DF stored on the SE, wherein deleting the DF comprises the steps of:
Decrementing a usage counter for all blocks used by the DF,
Deleting by the PE for all blocks used by the DF, when the usage counter reaches zero, the corresponding encryption keys and/or the corresponding chunking keys, and
Deleting the corresponding encryption keys and/or the corresponding chunking keys on the CE.

2. The method according to claim 1, wherein prior to step a) an initial hash value over the DF is computed by the CE and the initial hash value is transmitted by the CE to the PE to check whether the DF has already been stored, wherein if the DF has already been stored, one or more of the steps a)-f) are not performed.

3. The method according to claim 1, wherein the encryption key is computed based on at least one of: contents of the DF or a secret.

4. The method according to claim 3, wherein the secret is based on proxy information and/or CE information.

5. The method according to claim 4, wherein the secret is computed by the PE and provided to the CE and/or is computed by the CE.

6. The method according to claim 1, wherein the one-way function is based on Advanced Encryption Standard (AES).

7. The method according to claim 1, wherein the chunking key is protected by at least one of: trusted computing, a hardware dongle, or secure multi-party computation, wherein the trusted computing is provided by a hypervisor as the CE, wherein the hypervisor communicates with the PE by one or more secure channels.

8. The method according to claim 1, wherein the one-way function is an oblivious one-way function.

9. The method according to claim 1, wherein the CE is a client computing entity.

10. The method according to claim 1, wherein the PE regularly checks at least part of the stored information on the SE and verifies its correctness.

11. The method according to claim 1, wherein the PE are provided in form of client computing entities.

12. A reading method for reading the DF stored with the method according to claim 1, the reading method comprising the steps of:
A) Querying, by the CE, one or more of the PE for information about the DF,
B) Providing the information about the DF by the queried PE,
C) Downloading the blocks of the DF by the CE,
D) Decrypting the downloaded blocks, and
E) Merging the decrypted blocks to the DF.

13. The method according to claim 1, wherein deleting the DF further comprises the steps of:
Requesting, by the CE, the deletion of the DF from the PE, and
Informing the SE to delete the DF.

14. A system for storing a data file, 'DF', comprising:
at least one computing entity, 'CE',
a proxy, 'PE', and
a storage entity, 'SE' for storing the DF,
wherein the CE is adapted to:
a) Chunk the DF into a number of blocks using a one-way-function and a chunking key,
b) Compute a hash value for each of the blocks,
d) Encrypt the blocks not being stored using an encryption key,
e) Transmit the encrypted blocks to the SE for storing,
f) Inform, the PE about the hash values of the transmitted blocks and corresponding storage location information of the transmitted blocks,
i) Deleting the corresponding encryption keys and/or the corresponding chunking keys on the CE, and
wherein the PE is adapted to:
c) Check whether the blocks are already stored resulting in a first number of already stored blocks and a second number of blocks not being stored,
g) Decrementing a usage counter for all blocks used by the DF, and
h) Deleting for all blocks used by the DF, when the usage counter reaches zero, the corresponding encryption keys and/or the corresponding chunking keys.

15. A non-transitory computer readable medium storing a program causing one or more computing devices to execute a process for storing and deleting a data file, 'DF' on a storage entity, 'SE', the process comprising the steps of:
a) Chunking the DF into a number of blocks using a one-way-function and a chunking key,
b) Computing a hash value for each of the blocks,
c) Checking whether the blocks are already stored resulting in a first number of already stored blocks and a second number of blocks not being stored,
d) Encrypting the blocks not being stored using an encryption key,
e) Transmitting the encrypted blocks to the SE for storing, and
f) Informing about the hash values of the transmitted and corresponding storage location information of the transmitted blocks,
g) Deleting the DF stored on the SE, wherein deleting the DF comprises the steps of:
Decrementing a usage counter for all blocks used by the DF,
Deleting for all blocks used by the DF, when the usage counter reaches zero, the corresponding encryption keys and/or the corresponding chunking keys, and
Deleting the corresponding encryption keys and/or the corresponding chunking keys on the CE.

* * * * *